(12) United States Patent
McHann, Jr. et al.

(10) Patent No.: US 9,037,305 B2
(45) Date of Patent: May 19, 2015

(54) POWER OUTAGE VERIFICATION

(75) Inventors: Stanley E. McHann, Jr., Crosslake, MN (US); Robert Zeppetelle, Brainard, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 1469 days.

(21) Appl. No.: 12/715,500

(22) Filed: Mar. 2, 2010

(65) Prior Publication Data

US 2011/0218686 A1 Sep. 8, 2011

(51) Int. Cl.
  *G05D 3/12* (2006.01)
  *G05D 5/00* (2006.01)
  *G05D 9/00* (2006.01)
  *G05D 11/00* (2006.01)
  *G05D 17/00* (2006.01)
  *G06F 17/00* (2006.01)
  *G01R 13/00* (2006.01)
  *H02J 13/00* (2006.01)

(52) U.S. Cl.
  CPC ......... *H02J 13/0062* (2013.01); *H02J 13/0075* (2013.01); *H02J 13/0086* (2013.01); *Y04S 10/30* (2013.01); *Y02E 60/74* (2013.01)

(58) Field of Classification Search
  CPC ...................................................... G06Q 50/06
  USPC ............................ 700/90, 286, 291, 292, 323
  See application file for complete search history.

(56) References Cited

U.S. PATENT DOCUMENTS

| | | |
|---|---|---|
| 5,581,229 A | 12/1996 | Hunt |
| 6,154,488 A | 11/2000 | Hunt |
| 6,177,884 B1 | 1/2001 | Hunt et al. |
| 6,998,963 B2 | 2/2006 | Flen et al. |
| 7,102,490 B2 | 9/2006 | Flen et al. |
| 7,145,438 B2 | 12/2006 | Flen et al. |
| 7,180,412 B2 | 2/2007 | Bonicatto et al. |
| 7,184,861 B2 | 2/2007 | Petite |
| 7,209,840 B2 | 4/2007 | Petite et al. |
| 7,224,740 B2 | 5/2007 | Hunt |
| 7,236,765 B2 | 6/2007 | Bonicatto et al. |

(Continued)

FOREIGN PATENT DOCUMENTS

KR   10-2009-0032395   4/2009

OTHER PUBLICATIONS

PCT/US2011/026667, Oct. 26, 2011, PCT Search Report ISA/Korea/KR.

*Primary Examiner* — Tejal Gami
*Assistant Examiner* — Ziaul Karim
(74) *Attorney, Agent, or Firm* — Crawford Mauna PLLC

(57) ABSTRACT

Methods, systems, and apparatus, including computer programs encoded on a computer storage medium, for detecting a power outage. In one aspect, a status request requesting a status of a portion of a power distribution network is received, where the request includes a reference to a power meter that is located within the portion of the network. In response to the status request, a block of communications channels is selected, where the block includes a target communications channel over which a signal corresponding to the referenced power meter is received. In turn, an amplitude of the signal being received over the target communications channel is obtained. A determination is made whether the amplitude of the signal is less than an outage threshold and a status notification is provided that specifies the status of the portion of the power distribution network for which the status has been requested.

18 Claims, 5 Drawing Sheets

(56) References Cited

U.S. PATENT DOCUMENTS

| | | |
|---|---|---|
| 7,346,463 B2 | 3/2008 | Petite et al. |
| 7,382,232 B2 * | 6/2008 | Gidge et al. ............... 340/12.32 |
| 7,432,824 B2 | 10/2008 | Flen et al. |
| 7,443,313 B2 | 10/2008 | Davis et al. |
| 7,468,661 B2 | 12/2008 | Petite et al. |
| 7,706,320 B2 | 4/2010 | Davis et al. |
| 7,738,999 B2 | 6/2010 | Petite |
| 7,742,393 B2 | 6/2010 | Bonicatto et al. |
| 7,774,530 B2 | 8/2010 | Haug et al. |
| 7,791,468 B2 | 9/2010 | Bonicatto et al. |
| 7,877,218 B2 | 1/2011 | Bonicatto et al. |
| 7,978,059 B2 | 7/2011 | Petite et al. |
| 8,144,816 B2 | 3/2012 | Bonicatto et al. |
| 8,144,820 B2 | 3/2012 | Bonicatto |
| 8,194,789 B2 | 6/2012 | Wolter et al. |
| 8,238,263 B2 | 8/2012 | Kohout et al. |
| 8,462,014 B1 * | 6/2013 | Kardos et al. ............ 340/870.02 |
| 2008/0215268 A1 | 9/2008 | Bonicatto et al. |
| 2008/0304595 A1 | 12/2008 | Haug et al. |
| 2009/0187284 A1 | 7/2009 | Kreiss et al. |
| 2009/0187285 A1 | 7/2009 | Yaney et al. |
| 2010/0329247 A1 * | 12/2010 | Kennedy et al. ............... 370/389 |
| 2011/0121952 A1 | 5/2011 | Bonicatto et al. |
| 2011/0176598 A1 | 7/2011 | Kohout et al. |
| 2011/0218686 A1 | 9/2011 | McHann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |
| 2012/0109388 A1 * | 5/2012 | Haugh ........................ 700/286 |

* cited by examiner

POWER OUTAGE VERIFICATION

BACKGROUND

This specification relates to verifying power distribution network outages.

Service providers utilize distributed networks to provide services to customers over large geographic areas. For example, power companies utilize a network of power lines and meters to provide power to customers throughout a geographic region.

Operational problems in the network can result in lost revenue for the service provider. For example, the service provider may lose revenue based on an inability to provide service during a power outage. Therefore, when a power outage or other network event that disrupts service occurs, it is in the best interest of the service provider to identify the cause of the problem and correct the problem as soon as possible.

In many distributed networks, service providers first receive an indication that there is a problem with the network based on feedback from customers. For example, customers may call the service provider to report a power outage. Based on the information received from the customer, the service provider can take action to remedy the problem with the network. For example, a service provider may access power meters in the network to retrieve additional information regarding the status of the network and/or dispatch workers to attempt to identify the problem.

While a service provider can remedy power outages and other network problems by accessing power meters in the network and/or dispatching workers, the time and resources required to verify the existence of an outage or other problem can result in significant loss of revenue for the service provider. Thus, if a service provider can reduce the time required to identify whether a problem exists in a network, the service provider can reduce lost revenue due to network outages and increase customer satisfaction.

SUMMARY

In general, one innovative aspect of the subject matter described in this specification can be embodied in methods that include the actions of receiving, by a data processing apparatus, a status request requesting a status of a first portion of a power distribution network, the request including a reference to a referenced power meter that is located within the first portion of the power distribution network for which the status is requested; selecting, by the data processing apparatus, a block of communications channels that includes a target communications channel over which a signal corresponding to the referenced power meter is received; obtaining, by the data processing apparatus, an amplitude of the signal being received over the target communications channel; determining, by the data processing apparatus, whether the amplitude of the signal being received over the target communications channel is less than an outage threshold for the target communications channel; and in response to determining whether the amplitude of the signal being received over the target communications channel is less than the outage threshold for the target communications channel, providing, by the data processing apparatus, a status notification that specifies the status of the first portion of the power distribution network for which the status has been requested. Other embodiments of this aspect include corresponding systems, apparatus, and computer programs, configured to perform the actions of the methods, encoded on computer storage devices.

These and other embodiments can each optionally include one or more of the following features. Methods can further include the actions of obtaining a geographic location identifier corresponding to the referenced power meter; determining that signals corresponding to additional power meters are received over other channels in the selected block of communications channels, the additional power meters having geographic identifiers specifying that the additional power meters are located within an expanded portion of the network; determining, for each of the other channels, whether an amplitude of a signal being received over the other channel is less than an outage threshold for the other channel; and providing, for the expanded portion of the network that is defined by the referenced power meter and the additional power meters, a second status notification that specifies a status of the expanded portion of the power distribution network.

Determining that signals corresponding to additional power meters are received over other channels in the selected block of communications channels can include the actions of obtaining, for each of the other channels, a geographic location identifier for a candidate power meter communicating over the other channel; determining, for each of the channels, whether the candidate power meter is in the expanded portion of the power distribution network; in response to determining that the candidate power meter is in the expanded portion of the power distribution network, identifying the candidate power meter as an additional power meter with which the status of the expanded portion of the power distribution network is determined; and in response to determining that the candidate power meter is not in the expanded portion of the power distribution network, identifying the candidate power meter as an omitted meter that is not used to determine the status of the expanded portion of the power distribution network.

Obtaining a geographic location identifier for the candidate power meter can include receiving the geographic location identifier from an indexed list of communications channels, power meters, and corresponding geographic location identifiers for the power meters. Determining whether the candidate power meter is in the expanded portion of the power distribution network can include determining whether the candidate power meter is within a threshold distance of the referenced power meter. Determining whether the candidate power meter is in the expanded portion of the power distribution network can include determining whether the candidate power meter receives power from a same power substation as the referenced power meter. Determining whether the candidate power meter is in the expanded portion of the power distribution network can include determining whether the candidate power meter is on a same street as the referenced power meter. Determining whether the candidate power meter is in the expanded portion of the power distribution network comprises determining whether the candidate power meter is in a same specified geographic area as the referenced power meter.

Selecting a block of communications channels can include selecting a block of communications channels where the target communications channel is at a center channel frequency relative to other communications channels in the block. Providing a status notification can include providing a power outage notification in response to determining that the amplitude of the signal being received over the target communications channel is less than the outage threshold. Providing a status notification can include providing, in response to determining that the amplitude of the signal is not less than the outage threshold, a status notification specifying that a power outage has not been detected.

Methods can further include the actions of obtaining a geographic location identifier corresponding to the referenced power meter; identifying additional power meters, each additional power meter having a corresponding geographic identifier specifying that the additional power meter is located within a threshold distance of the referenced power meter; identifying, for each additional power meter, a corresponding communications channel over which the additional power meter communicates; obtaining, for each additional power meter, an amplitude of a signal being received over the corresponding communications channel; determining, for each additional power meter, whether the amplitude of the signal being received over the corresponding communications channel is less than an outage threshold for the corresponding communications channel; and providing, for an expanded portion of the power distribution network that is defined by the geographic location identifier corresponding to the referenced power meter and the additional power meters, a second status notification that specifies a status of the expanded portion of the power distribution network.

Particular embodiments of the subject matter described in this specification can be implemented so as to realize one or more of the following advantages. Power outages can be detected based on amplitudes of communications signals received over communications systems prior to recovering data from the communications channels. An area affected by a power outage can be determined based on the amplitudes of signals being received from power meters in the power distribution network, thereby reducing the time required to detect an outage relative to the time required to detect an outage based, for example, on data recovered from the signals.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A status subsystem can be used to identify or verify the occurrence of a power outage in a portion of a power distribution system based on amplitudes of communications signals received form power meters installed in the portion of the power distribution system. For example, when the amplitude of a signal received over a communications channel corresponding to a particular power meter is below an outage threshold, a determination can be made that there is a power outage in the portion of the power distribution system in which the particular power meter is located.

Figure 1:
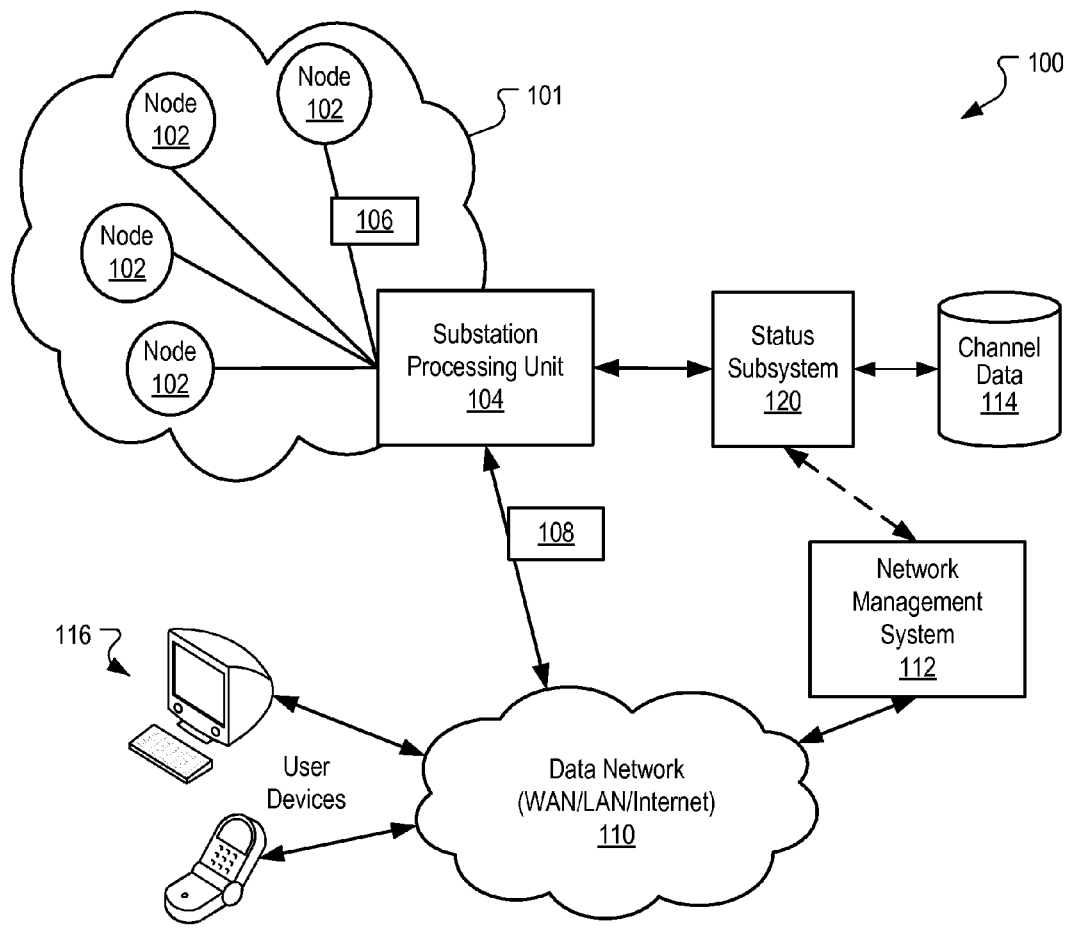
FIG. 1 is a block diagram of an example network environment.

FIG. 1 is a block diagram of an example network environment. The network environment 100 includes a service network 101 in which a plurality of nodes 102 are coupled to a consolidator 104. In some implementations, the service network 101 is a power distribution network in which the nodes 102 are power meters. In these implementations, the power meters can be implemented to monitor and report various operating characteristics of the power distribution network. Example characteristics of the power distribution network include average or total power consumption, power surges, power drops and load changes among other characteristics.

The nodes 102 report the operating characteristics of the network over communications channels. Communications channels are portions of radio frequency spectrum over which data are transmitted. The frequency spectrum and bandwidth of each communications channel can depend on the communications system in which they are implemented. For example, communications channels for power meters can be implemented in power line communication (PLC) systems and wireless communications systems such as cellular communications systems, wireless broadband networks, wireless mesh networks and other wireless communications systems.

Communications channels for each of these different communications systems have distinct operating parameters that are defined, in part, by communications standards and/or environmental considerations. For example, in a PLC system, operating parameters for communications channels are defined so that the communications channels can operate on the same transmission lines on which power is distributed throughout a power grid. The description that follows refers to communications channels of PLC systems for example purposes. However, the description can be applied to communications channels in other communications systems.

In some implementations, the nodes 102 transmit data representing the operating characteristics of the service network 101 over communications channels to a substation processing unit 104. The substation processing unit 104 is a processing apparatus that receives communications from nodes 102 operating in a portion of the service network and consolidates the communications for transmission though a data network 110 or processes the communications and provides instructions to the nodes 102 in response to the communications. For example, the substation processing unit 104 can receive data bits or data packets 106 from nodes 102 and generate a consolidated packet 108 that includes data from multiple data packets 106 received from the nodes 102. In turn, the substation processing unit 104 can transmit the consolidated packets over the data network 110 to a network management system 112. The substation processing unit 104 can also operate as a repeater to retransmit the data packets 106 through the data network 110 instead of creating a consolidated packet 108.

A substation processing unit 104 can be implemented as a node 102, a repeater, a router or any other data processing apparatus that can receive data from nodes 102 and retransmit the data through a network environment 100. In some implementations, a single consolidator 104 can receive data packets 106 from thousands of nodes 102 and transmit the data packets 106 and/or consolidated packets 108 through the data network 110. The substation processing unit 104 can also be implemented as a data processing system that receives the communications from the nodes, processes data recovered from the communications, and provides output in response to the data.

The data network 110 can be a wide area network (WAN), local area network (LAN), the Internet, or any other communications network, including a PLC network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only one substation processing unit 104 is shown, the service network 101 can include many different substation processing units 104 to couple many thousands of nodes to the data network 110.

In some implementations, the data network 110 couples the substation processing unit 104 to a network management system 112. The network management system 112 is a system that monitors and/or controls the service network 101. The network management system 112 can control different characteristics of the service network 101 based on data received from nodes 102 that are installed in the service network 101.

For example, in a PLC network, the network management system 112 can receive a consolidated packet 108 that includes data indicating that power usage is significantly higher in a particular portion of a power network than in other portions of the power network. Based on this data, the network management system 112 can allocate additional resources to that particular portion of the network (i.e., load balance) or provide status data specifying that there is increased power usage in the particular portion of the power network.

The network management system 112 can provide the status data to a user device 116 that can be accessed, for example, by the network operator, maintenance personnel and/or customers. For example, status data identifying the detected increased usage described above can be provided to a user device 116 accessible by the network operator, who can, in turn, determine an appropriate action to take in regard to the increased usage. Similarly, if the status data indicates that there is a power outage, the network management system 112 can provide data to user devices 116 accessible by customers to provide information regarding the existence of the outage and potentially provide information estimating a duration of the outage.

Data packets 106 and/or consolidated packets 108 may be transmitted over one of thousands of channels in a PLC system. However, the signals received over the channels in the PLC system can be affected by network events. For example, when a power outage occurs in a PLC network, amplitudes of communications signals that are transmitted on channels over which nodes affected by the power outage communicate can decrease relative to the amplitudes of the communications signals when power is uninterrupted. Amplitudes of communications signals can be measured in units of voltage or power (or in unitless measurements). When the amplitude of the noise floor of a channel is equal to or greater than the amplitude of the communications signal, the amplitude of the noise floor can be used as the amplitude of the communications signal.

The amplitude of each signal being received over each respective channel can differ significantly. For example, an amplitude (e.g., absolute or relative to a noise floor) of a first signal being received over a first channel can be consistently lower than the amplitude of another signal being received over another channel. The differences in absolute and/or relative signal amplitudes can be caused, for example, by the operating characteristics of the respective channels. For example, the first channel may have a center frequency that corresponds to an RF frequency for which signals through the PLC are significantly attenuated relative to other channels in the system. Similarly, a noise floor for the first channel can be higher relative to the noise floors of other channels, such that even if the absolute amplitudes of the signals being received over the channel are similar, amplitudes of the signals relative to their respective noise floors can differ. The noise floor of a channel as used throughout this document refers to a measure of the signals from noise sources that are present on the channel.

The amplitudes of the communications signals being received over the different channels of the PLC network can be used to determine, or verify, the existence of a power outage in a power distribution network. To facilitate determination and/or verification of a power outage, the subsystem processing unit 104 can include a status subsystem 120. The status subsystem 120 is a data processing apparatus that can receive a status request corresponding to a particular portion of the power distribution network, identify a channel over which a power meter in that particular portion of the power distribution network is operating, and provide a notification of whether a power outage is being detected in that particular portion of the power distribution network based on the amplitude of a signal being received over the identified channel.

In systems where the subsystem processing unit 104 continually receives signals carrying data from power meters in the power distribution network, rather than pinging (i.e., sending a request for data to) the meters, the status subsystem 120 can obtain the amplitude of the signal being received over a channel on demand, and thereby detect an outage prior to recovering data being transmitted over the channel.

For example, in response to receiving a call from a customer reporting a power outage, a utility operator can send a status request to the status subsystem 120, requesting the status of the power distribution network at the customer's location. In turn, the status subsystem 120 can identify, for example, the communications channel over which the customer's power meter communicates and determine whether the amplitude of the signal being received over the communications channel is below an outage threshold. If the amplitude is below the outage threshold, the status subsystem 120 can provide a status notification specifying the existence of a power outage at the customer's location. If the amplitude is not below the outage threshold, the status subsystem 120 can provide a status notification specifying that a power outage has not been detected at the customer's location.

The outage threshold is a value that is used to determine whether an outage is being detected in a portion of a power distribution network. For example, the outage threshold can be a minimum amplitude value for signals being received over channels in the communications network. When the amplitude of the signal being received over a channel is below the outage threshold, a power outage is detected.

The outage threshold can be globally set for every communications channel in the power line communications network, or independently set for individual channels or groups of channels in the power line communications network. The outage threshold can be set to an absolute amplitude value or a relative amplitude value (e.g., relative to the noise floor of the channel), and can be determined based on historical channel data that is stored in a channel data store 114.

The channel data store 114 can store historical signal amplitudes for signals received over each channel. For example, the channel data store 114 can include signal amplitudes that have been measured for each channel over one day, one week, one year, or longer based on available memory resources in the channel data store 114. As described in more detail below, the historical signal amplitudes can be used to specify the outage threshold for each channel.

Using the status notification, the utility operator can provide the customer with additional information regarding the status of the power distribution network at the customer's location. For example, when the status notification indicates that an outage has not been detected, the utility operator can inform the customer that an outage has not been detected at the customer's location and/or provide the customer with a list of suggestions for determining the source of the problem. When the status notification indicates that an outage has been detected, the utility operator can inform the customer of the outage and/or provide an estimated time at which the outage may be corrected. Additionally, the utility operator can take action with respect to correcting the outage, for example, by deploying a repair crew to the customer's location and/or initiating additional network analysis systems and/or processes to identify the cause of the outage.

In some implementations, determination and/or verification of a power outage can be performed by the network management system 112. In these implementations, the status subsystem 120 is coupled to the network management system 112 and a channel data store 114. Signal amplitudes are measured or detected by the substation processing unit 104 and amplitude data representing the signal amplitudes are transmitted over the data network 110 to the network management system 112. In these implementations, the network management system 112 receives the amplitude data and provides the amplitude data to the status subsystem 120 to determine whether a power outage is determined to be occurring. In turn, the network management system 112 receives the status notification from the status subsystem 120 and provides the notification to a user device 116 and/or send status data to the substation processing unit 104.

Figure 2:
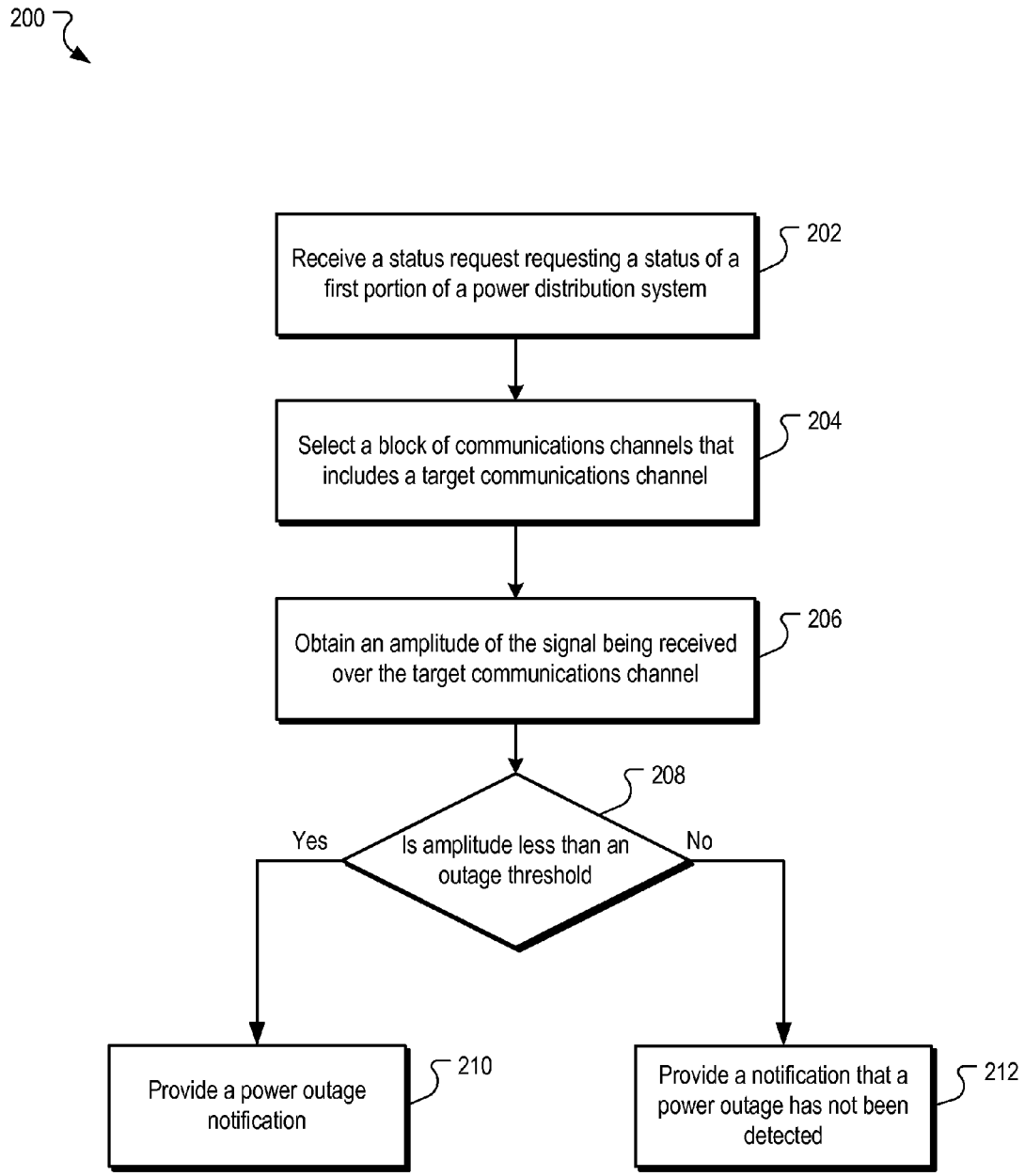
FIG. 2 is flow chart of an example process for providing a status notification for a portion of a power distribution network.

FIG. 2 is flow chart of an example process 200 for providing a status notification for a portion of a power distribution network. The process 200 is a process by which the status notification is provided in response to a status request. For example, in response to a status request, a block of communications channels that includes a target communications channel is selected. The block of communications channels is analyzed to obtain an amplitude of a signal being received over the target communications channel. In turn, a determination is made as to whether the amplitude is less than an outage threshold. If the amplitude is less than the outage threshold, the status notification reports a power outage, whereas the status notification reports that a power outage has not been detected when the amplitude is above the outage threshold.

The process 200 can be implemented, for example, by the status subsystem 120 of FIG. 1. In some implementations, the status subsystem 120 includes one or more processors that are configured to perform actions of the process 200. In other implementations, a computer readable medium can include instructions that when executed by a computer (or another data processing apparatus) cause the computer to perform actions of the process 200.

A status request requesting a status of a portion of a power distribution system is received (202). In some implementations, the status request can be received, for example, from a utility operator that is requesting the status in response to a call from a customer reporting a power outage at the customer's location. For example, the utility operator can submit the status request by initiating an outage verification program or script that sends the status request to the status subsystem. In other implementations, the status request can be received in response to input from a customer. For example, in response to a customer calling an automated outage reporting system and reporting a power outage at the customer's location, a status request can be initiated and sent to the status subsystem.

In some implementations, the status request can include data specifying the portion of the network for which the status is being requested. In these implementations, the request can include a reference to a power meter ("referenced power meter") that is located within the portion of the network for which the status is being requested. For example, the status request can include customer data identifying the customer and/or a meter corresponding to the customer's location. This customer data can include, for example, a serial number of a power meter that is installed at the customer's location, an account number corresponding to the customer, or any other customer data (e.g., telephone number or physical address) that can be used to identify the customer or network components (e.g., power meter or substation) that serve the customer.

A block of communications channels that includes a target communications channel is selected (204). In some implementations, the target communications channel is a communications channel over which the signal corresponding to the referenced power meter is received. The channel over which the signal from the referenced power meter is received can be determined, for example, based on an indexed list of communications channels, references to power meters, and/or customer account numbers, or other customer identifiers (e.g., telephone number and/or physical address). For example, when the status request includes a serial number corresponding to a power meter that is installed at a customer location, the indexed list of communications channels can be accessed to identify a communications channel that is assigned to the power meter that is installed at the customer location. In turn, the identified communications channel can be identified as the target communications channel.

The block of communications channels that is selected can include any number of communications channels. For example, the block of communications channels can include only the target communications channel. Alternatively, the block of communications channels can include the target communications channel and other communications channels. The other communications channels that are included in the block of communications channels can be, for example, communications channels that are channels adjacent to the target communications channel.

An adjacent channel is a next higher or next lower communications channel relative to a reference channel. For example, if channels in a communications system have center frequencies that are 1 Megahertz ("MHz") apart, then the adjacent channels for a communications channel having a center frequency of 50 MHz can be those channels having center frequencies at 49 MHz and 51 MHz, respectively. Thus, a block of communications channels including the target communications channel centered at 50 MHz can also include the channels centered at 49 MHz and 51 MHz.

The other communications channels that are included in the block of communications channels can also include contiguous communications channels beyond the channels that are immediately adjacent to the target communications channel. For example, in the example above, the block of communications channels can further include each contiguous channel having a center frequency from 0 MHz to 100 MHz. If each channel has a center frequency that is 1 MHz from the center of its adjacent channels, then this block of communications channels can include 100 channels.

The number of communications channels that are included in the block of communications channels can be selected based on processing resources that are available as well as design considerations. For example, the receiver in a PLC system can receive thousands of signals over thousands of channels. At different processing stages, the number of channels being analyzed can be systematically reduced to recover and analyze the signals being received. For example, at a first processing stage, filtering techniques can be used to isolate groups of signals that are within a specified bandwidth and route each group of signals to separate processing resources for parallel processing. In turn, the processing resources that receive each group of signals can further filter the signals to further isolate smaller groups of signals as well as the individual signals received over each of the channels. Thus, the number of channels included in the processing stage at which the signals are being analyzed can help determine a number of signals that will be included in the block of communications channels.

In some implementations, the block of communications channels is selected so that the target communications channel is at a center channel frequency relative to other communications channels in the block. Continuing with the example above, in these implementations, the contiguous set of channels that are included in the block of communications channels can be selected so that the channel at the center frequency 50 MHz is also the center frequency relative to the center frequencies for the other channels included in the block of communications channels. In other implementations, the target communications channel can be at any location within the block of communications channels.

An amplitude of the signal being received over the target communications channel is obtained (206). In some implementations, the amplitude can be obtained from a receiver that receives the signal being transmitted over the target communications channel. In other implementations, the amplitude can be obtained from measurement equipment (e.g., an oscilloscope, spectrum analyzer, communications channel analyzer, or power meter) that measures the amplitude of the signal. The amplitude can also be obtained by accessing a data store storing a recently measured amplitude for the signal being received over the target communications channel. The amplitude of the signal can be an absolute measure of amplitude (e.g., relative to ground) or a measure of amplitude that is measured relative to a noise floor for the channel or another reference signal.

A determination of whether the amplitude for the signal being received over the target communications channel is less than an outage threshold is made (208). In some implementations, the outage threshold is a channel-specific outage threshold. In these implementations, the outage threshold for each channel can be determined based on historical amplitude measures of the signal being received over the channel. For example, the historical amplitude measured of the signal can be statistically analyzed to determine a threshold amplitude below which a power outage is likely to be occurring. This threshold amplitude is referred to as an outage threshold.

In some implementations, the outage threshold can be computed based on a baseline amplitude for the signal being received over the channel. The baseline amplitude can be, for example, an average historical amplitude, a median historical amplitude, or some other statistical measure for the historical amplitude measures. In these implementations, the outage threshold can be set to an amplitude that is a specified amount less than the baseline amplitude. The specified amount can be, for example, a percentage of the baseline amplitude or an absolute amount below the baseline amplitude. The specified amount can be selected, for example, based on a statistical analysis of signal amplitudes that were measured when a power outage was known to be occurring and signal amplitudes that were measured when a power outage was known to not be occurring.

Alternatively, the specified amount can be determined based on a statistical analysis of all signal amplitudes for the signal irrespective of whether a power outage was known to be occurring or not. For example, by selecting a specified amount that causes 97% of the historical amplitudes to be above the outage threshold, the outage threshold is likely to be violated approximately 3% of the time. Therefore, when the amplitude of the signal is less than the outage threshold, it can be considered an indication that a power outage is occurring.

The outage threshold can be used to determine whether a power outage is occurring or verify a suspected outage based on the amplitude of the signal received over the corresponding channel being less than the outage threshold. Determining or verifying existence of a power outage based on the amplitudes of the signals increases the speed at which the outage can be determined or verified because the amplitudes of the signals can be detected prior to fully processing the data being received over the channels.

The outage thresholds for each of the channels can be regularly updated, stored in a data store, and indexed based on the communications channel to which the outage threshold corresponds. Alternatively, the outage thresholds can be computed on demand, for example, in response to a status request, and based on the most recent amplitude measures for signals being received over the communications channel. For example, the outage thresholds can be computed based on historical amplitude measures for signals received over the communications channel over a past hour, day, week, month or other delineation of time.

To determine whether the amplitude of the signal being received over the target communications channel violates the outage threshold (i.e., is less than the outage threshold), the outage threshold for the target communications channel can be computed or obtained from a data store and then compared to the amplitude of the signal.

In response to determining that the amplitude of the signal being received over the target communications channel is less than the outage threshold, a power outage notification can be provided (210). The power outage notification is a status notification that specifies that a power outage has been detected in the portion of the power distribution network for which the status has been requested. For example, a power outage notification that is provided in response to a status request specifying a single power meter can be a notification that a power outage has been detected at the location of that power meter. The status notification can be provided on a display device, sent in an e-mail or other electronic communications medium, audibly provided, or otherwise provided to a device from which the status request was initiated. The status notification can also provide the status of an expanded portion of the power distribution network, as described with reference to FIG. 3.

In response to determining that the amplitude of the signal being received over the target communications channel is not less than the outage threshold for the target communications channel, a status notification specifying that a power outage has not been detected can be provided (212). The status notification can be provided on a display device, sent in an e-mail or other electronic communications medium, audibly provided, or otherwise provided to a device from which the status request was initiated.

In some implementations, the portion of the network for which the status notification provides a status corresponds to the portion of the network in which a single meter is operating (i.e., the location at which the single meter is installed). In these implementations, the status of the network can be iteratively determined or verified in response to each status request that requests the status of the network at a location corresponding to a power meter referenced by the status request.

In other implementations, the status of another portion of the network can be determined or verified in response to a status request that references a single power meter. For example, using geographic location identifiers for the referenced power meter, additional power meters that are within a threshold distance of the referenced power meter can be identified, and the status of this other portion of the network (i.e., corresponding to the additional power meters) can also be determined in response to the status request. Determining the status of multiple portions of the network in response to a single status request enables a network operator to determine the extent of a power outage without requiring multiple status requests.

Figure 3:
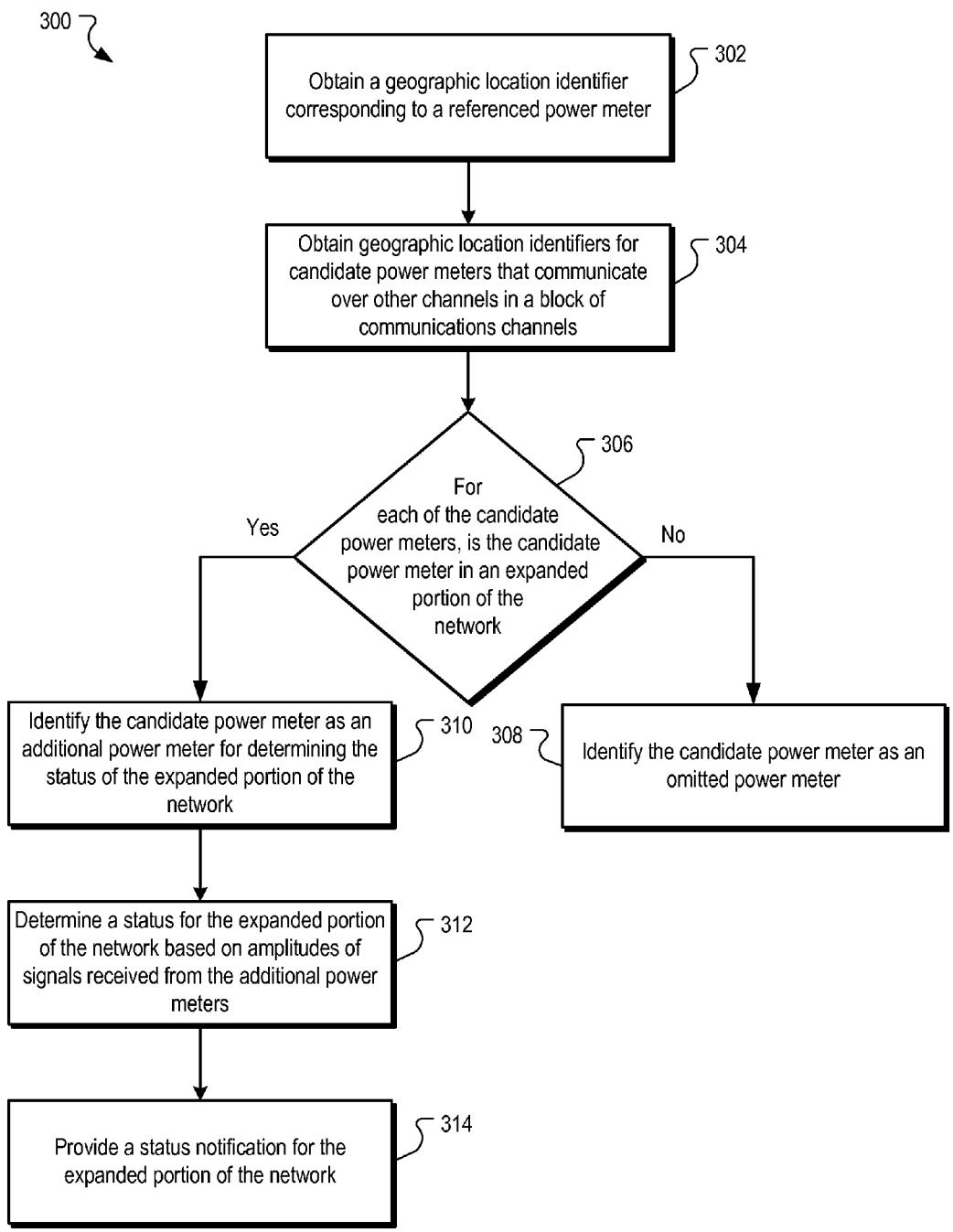
FIG. 3 is a flow chart of an example process for providing a status notification for another portion of a power network.

FIG. 3 is a flow chart of an example process 300 for providing a status notification for another portion of a power network. The other portion of the network can be, for example, a portion of the network that includes the referenced power meter as well as other power meters that are within a threshold distance of the referenced power meter. The other portion of the network can also be a portion of the network corresponding to power meters that receive power from a same power substation or are within a same neighborhood (i.e., within a specified geographic area). Thus, the other portion of the network can include the referenced power meter and additional power meters that are not explicitly referenced by a status request. The other portion of the network is referred to as an expanded portion.

The process 300 is a process by which a geographic location identifier corresponding to a power meter referenced by a status request is obtained. Using the geographic location identifier, additional power meters that are in an expanded portion of the network are identified and amplitudes of signals received from the additional power meters are compared to corresponding outage thresholds. In turn, a status notification for the expanded portion of the network is provided based on the amplitudes of the signals being received from the other power meters relative to the corresponding outage thresholds.

The process 300 can be implemented, for example, by the status subsystem 120 of FIG. 1. In some implementations, the status subsystem 120 includes one or more processors that are configured to perform actions of the process 300. In other implementations, a computer readable medium can include instructions that when executed by a computer (or another data processing apparatus) cause the computer to perform actions of the process 300.

A geographic location identifier corresponding to a referenced power meter is obtained (302). In some implementations, the referenced power meter is a power meter that is referenced by a status request, as describe above with reference to FIG. 2. In some implementations, the geographic location identifier is obtained in response to receipt of a status request requesting status of the network at the location of the referenced power meter. In other implementations, the geographic location identifier is obtained in response to the status request requesting the status of an expanded portion of the network in addition to the status of the network at the location of the referenced power meter.

For example, a user interface from which a user requests the status of the network can enable the user to specify an expanded portion of the network for which the user is requesting the status (e.g., only the portion at the location of the referenced power meter or a portion that includes the location of the referenced power meter and/or surrounding areas). In response to the user specifying an expanded portion of the network, data representing a request for the status of the expanded portion of the network can be received.

The geographic location identifier can be obtained, for example, from a data store storing an index of power meters that are installed in a power distribution network and corresponding geographic location identifiers. A geographic location identifier can be, for example, geographic coordinates (e.g., latitudinal and longitudinal coordinates) corresponding to the physical locations at which a power meter is installed. The geographic location identifier can also be a mailing address corresponding the location at which the power meter is installed or other location data corresponding to the location of the power meter (e.g., a reference to a floor of a high-rise to which the power meter corresponds).

Geographic location identifiers for candidate power meters that communicate over other channels in a block of communications channels are obtained (304). As described above with reference to FIG. 2, the block of communications channels can be a contiguous group of communications channels that includes a target communication channel over which the referenced power meter communicates. The candidate power meters that communicate over the other communications channels can be identified, for example, by accessing an indexed list of communications channels and the power meters that communicate over the communications channels. The indexed list can also include corresponding geographic identifiers for the indexed power meters such that once the candidate power meters have been identified, the geographic identifiers for the candidate power meters can be obtained from the indexed list.

Using the obtained geographic location identifiers, a determination is made whether each of the candidate power meters is in an expanded portion of the network (306). The expanded portion of the network can be defined, for example, based on the location of the referenced power meter and a threshold distance. For example, the expanded portion of the network may include the referenced power meter and all other power meters within three miles of the referenced power meter. Alternatively, the expanded portion of the network can be defined to include all power meters that receive power through a particular power substation, or other network element, such that the determination of whether the candidate power meter is in the expanded portion of the network is based on whether the candidate power meter receives power through the particular network element.

In some implementations, the expanded portion of the network can also be defined to include each power meter on a same street, each power meter located at a same city block, or each power meter measuring power usage for a multi-tenant property. In these implementations, the determination of whether the candidate power meter is in the expanded portion of the network can be made by determining whether the candidate power meter is located on the same street, at the same city block, or measures power for the multi-tenant property. The description that follows uses a threshold distance from the referenced power meter to define the expanded network, but other network delineations can also be used.

In some implementations, the determination is made, for each of the candidate power meters, by determining a distance between the referenced power meter and the candidate power meter, and comparing the distance to the threshold distance. The distance between the referenced power meter and the candidate power meter can be determined, for example, based on the geographic location identifiers for the referenced power meter and the candidate power meter. For example, using geographic coordinates for the referenced power meter and the candidate power meter, a straight-line distance between the two meters can be computed. In turn, this distance can be compared to the threshold distance to determine whether the candidate power meter should be used to determine the status of the expanded portion of the network In response to determining that a candidate power meter is not in the expanded portion of the network, the candidate power meter is identified as an omitted power meter for determining the status of the expanded portion of the network (308). For example, if the candidate power meter has a geographic location identifier corresponding to a location that is more than the threshold distance from the referenced power meter, the candidate power meter can be identified as an omitted power meter. In turn, the omitted power meter will not be used to determine the status of the expanded portion of the network.

In response to determining that a candidate power meter is in the expanded portion of the network, the candidate power meter is identified as an additional power meter for determining the status of the expanded portion of the network (310). For example, if the candidate power meter has a geographic location identifier corresponding to a location that is equal to or less than the threshold distance, the candidate power meter can be identified as an additional power meter. In turn, the status of the expanded portion of the network can be determined using the additional power meter.

A status for the expanded portion of the network is determined based on amplitudes of signals received from the additional power meters (312). In some implementations, the status of the expanded portion of the network is determined by comparing the amplitude of the signal received from each of the additional power meters to a corresponding outage threshold. For example, as described above with reference to FIG. 2, the amplitude of a signal being received over a communications channel other than the target communications channel and corresponding to an additional power meter can be compared to an outage threshold for the communications channel. If the amplitude is at least equal to the outage threshold, then an outage is not detected at the location of the additional power meter. If the amplitude is less than the outage threshold, an outage is detected at the location of the additional power meter.

The status of the expanded portion of the network can be determined on a per-meter and/or per-location basis. For example, because the geographic location identifiers corresponding to each additional power meter is available, the status of the network at the location of each of the additional power meters can be determined and logged as the status of the expanded network at the location of the additional power meter. In these implementations, a list of locations and a corresponding status of the network at each location can be maintained. This list of locations and corresponding status can be used to provide data identifying the extent of a power outage or otherwise narrow the source of the outage, as described below.

The status of the expanded portion of the network can also be determined in aggregate, for example, based on the status of the additional power meters. For example, a power outage can be detected in the expanded portion of the network when a power outage is detected for a threshold portion of the power meters in the expanded portion of the network. The threshold portion of the power meters can be an absolute number of power meters or a percentage of the additional power meters that are in the expanded portion of the network. For example, the threshold portion can be set to be 98% of all power meters. In this example, when a power outage is detected for more than 98% of the meters in the expanded portion of the network, it can be determined that the expanded portion of the network is experiencing a power outage. In some implementations, the threshold portion can be reduced in response to receipt of customer reports of a power outage at one or more locations in the expanded portion of the network.

A status notification is provided for the expanded portion of the network (314). In some implementations, the status notification is a single notification for the expanded portion of the network. For example, in response to determining that the expanded portion of the network is experiencing a power outage, a status notification can specify that an outage has been detected in the expanded portion of the network.

In other implementations, the status notification for the expanded portion of the network can provide a per-meter and/or per-location notification that specifies the status for the network at each meter and/or location of the expanded portion of the network. In these implementations, a list of locations (and/or meters) and a corresponding logged status at each location in the expanded portion of the network can be used to provide data specifying an extent of a power outage in the expanded portion of the network. For example, the status notification can include data that causes presentation of a status indicator for each location. The status indicators can be provided in a status listing, or presented, for example, on a map of the expanded portion of the network, so that outage areas within the expanded portion of the network can be visually identified.

Network operators can use the status indicators to determine potential locations that may correspond to the cause of a power outage. For example, upon inspection of the status indicators for the power meters, the network operator may determine that all of the power meters for which an outage has been detected or verified receive power through a particular network element (e.g., substation or transformer). In turn, the network operator can dispatch a repair crew to the location of the particular network element.

Figure 4:
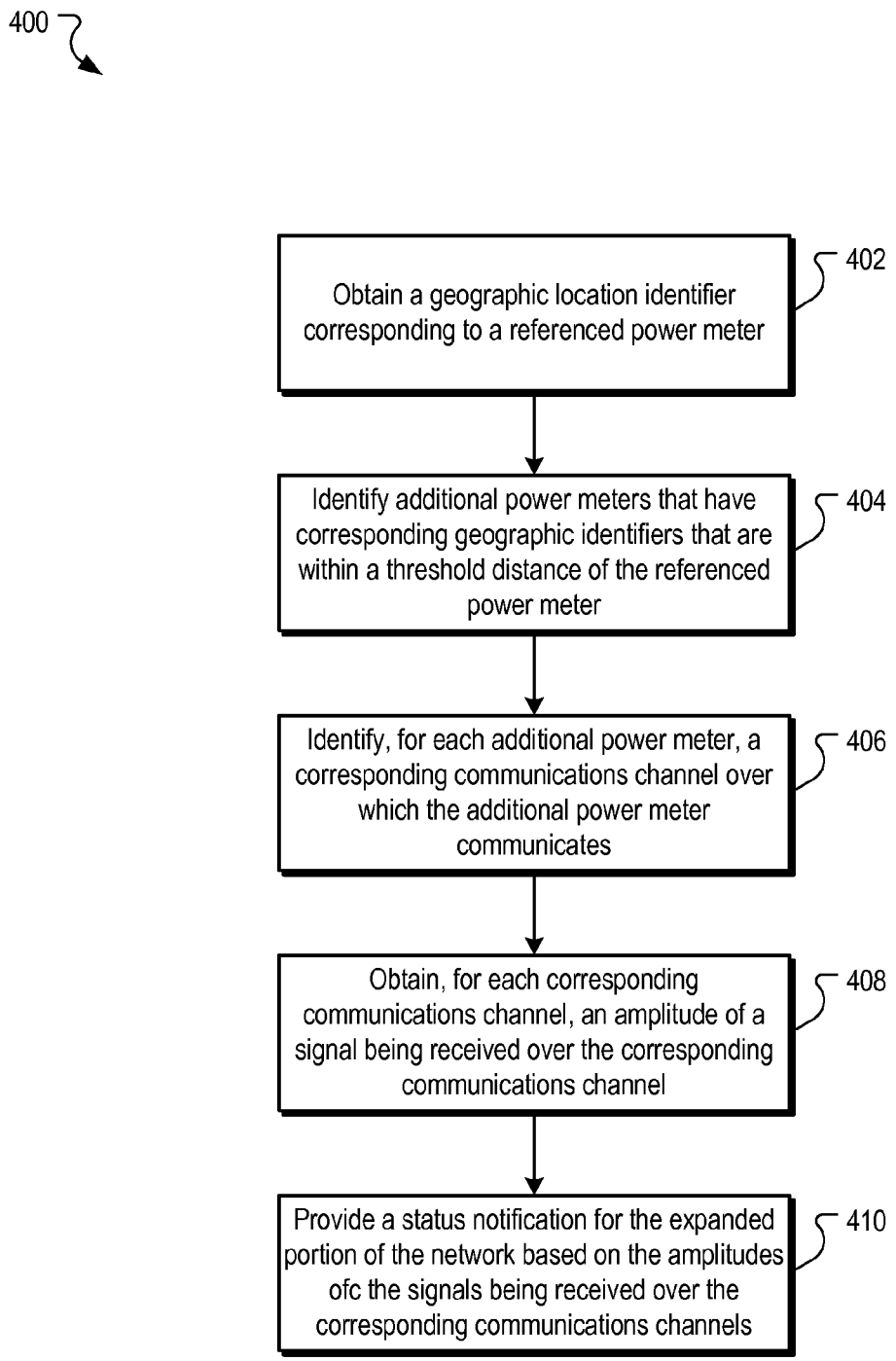
FIG. 4 is a flow chart of an example process for providing a status notification for an expanded portion of a power distribution network.

FIG. 4 is a flow chart of an example process 400 for providing a status notification for an expanded portion of a power distribution network. As described above, the expanded portion of the network can be a portion of the network that includes the referenced power meter as well as other power meters that are within a threshold distance of the referenced power meter.

The process 400 is a process by which a geographic location identifier corresponding to a power meter referenced by a status request is obtained. Using the geographic location identifier, additional power meters that are within a threshold distance of the referenced power meter are identified, where the additional power meters are not required to communicate over a communications channel that is included in a same block of communications channels as the referenced power meter. The communications channels over which the additional power meters communicate are identified. In turn, amplitudes of signals being received over the corresponding communications channels are obtained and a status notification for the expanded portion of the network is provided based on the amplitudes of the signals being received over the corresponding communications channels.

The process 400 can be implemented, for example, by the status subsystem 120 of FIG. 1. In some implementations, the status subsystem 120 includes one or more processors that are configured to perform actions of the process 400. In other implementations, a computer readable medium can include instructions that when executed by a computer (or another data processing apparatus) cause the computer to perform actions of the process 400.

As described with reference to FIG. 3, a geographic location identifier corresponding to a referenced power meter is obtained (402). Using the geographic location identifier for the referenced power meter, additional power meters that have geographic location identifiers corresponding to locations that are within a threshold distance of the referenced power meter are identified (404). The additional power meters can be identified, for example, by accessing an indexed list of power meters that includes graphic identifiers corresponding to the power meters. For example, a distance from the location of the referenced power meter, as specified by a corresponding geographic location identifier to the locations of power meters in the indexed list can be computed and compared to the threshold distance. Power meters that are within the threshold distance of the referenced power meter are identified as additional power meters that will be used to determine the status of the expanded portion of the power distribution network. In some implementations, the additional power meters are identified irrespective of the communications channel over which the power meters communicate.

A corresponding communications channel is identified for each additional power meter, where the corresponding communications channel is the communications channel over which the additional power meter communicates (406). As described with reference to FIG. 3, the corresponding communications channel for each additional power meter can be obtained from an indexed list of power meters and the corresponding communications channels over which the indexed power meters communicate.

An amplitude of a signal being received over each corresponding communications channel is obtained (408). In some implementations, the amplitude of the signal being received over each corresponding channel can be obtained from a receiver or another processing apparatus that is receiving and/or processing the signal from the corresponding communications channel. In other implementations, for each corresponding communications channel, a most recent amplitude measure that is available from a data store can be obtained from the data store.

A status notification for the expanded portion of the power distribution network is provided based on the amplitudes of the signals being received over the corresponding communications channels (410). As described with reference to FIG. 3, the status notification can specify that an outage is detected for the expanded portion of the power distribution network based on a number or portion of power meters for which an outage is being detected. Alternatively, the status notification can provide a list of power meters and/or locations and the status of the expanded network at each power meter and/or location. In turn, the status notification can cause presentation of the status of the meters and/or locations, for example, on a map of the expanded portion of the network.

Figure 5:
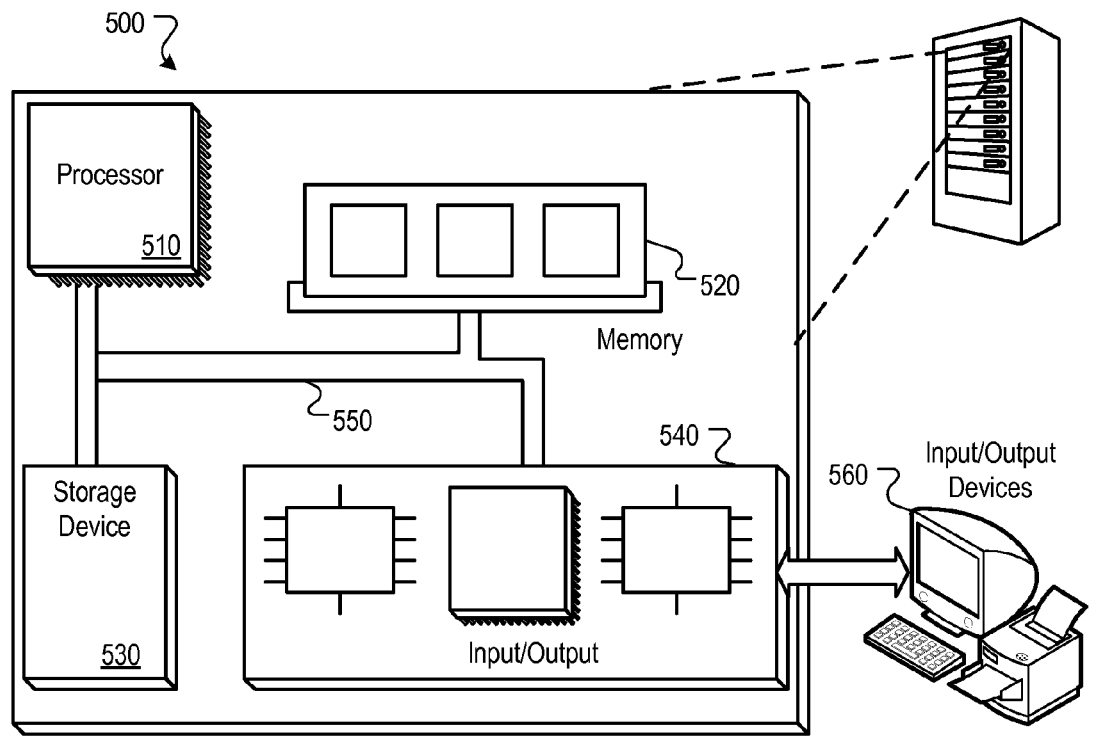
FIG. 5 is a block diagram of an example computer system that can be used to determine and/or validate power distribution network outages.

FIG. 5 is a block diagram of an example computer system 500 that can be used to determine and/or validate power distribution network outages. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them.

Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single embodiment. Conversely, various features that are described in the context of a single embodiment can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a data processing apparatus, including a circuit, coupled to a memory device, a status request requesting a status of a first portion of a power distribution network, the status request including a reference to a referenced power meter that is located within the first portion of the power distribution network for which the status is requested;
selecting, by the data processing apparatus, a block of communications channels that includes a target communications channel, at a center channel frequency relative to other communication channels in the block and with communication channels of the block on either side of the center channel frequency, over which a signal corresponding to the referenced power meter is received;
obtaining, by the data processing apparatus, an amplitude of the signal being received over the target communications channel;
determining, by the data processing apparatus, whether the amplitude of the signal being received over the target communications channel is less than an outage threshold for the target communications channel; and
in response to determining whether the amplitude of the signal being received over the target communications channel is less than the outage threshold for the target communications channel, providing, by the data processing apparatus, a status notification that specifies the status of the first portion of the power distribution network for which the status has been requested.

2. The method of claim 1, further comprising:
obtaining a geographic location identifier corresponding to the referenced power meter;
determining that signals corresponding to additional power meters are received over other channels in the selected block of communications channels, the additional power meters having geographic identifiers specifying that the additional power meters are located within an expanded portion of the power distribution network;
determining, for each of the other channels, whether an amplitude of a signal being received over the other channel is less than an outage threshold for the other channel; and
providing, for the expanded portion of the power distribution network that is defined by the referenced power meter and the additional power meters, a second status notification that specifies a status of the expanded portion of the power distribution network.

3. The method of claim 2, wherein determining that signals corresponding to additional power meters are received over other channels in the selected block of communications channels comprises:
for each of the other channels:
obtaining a geographic location identifier for a candidate power meter communicating over the other channel;
determining whether the candidate power meter is in the expanded portion of the power distribution network;
in response to determining that the candidate power meter is in the expanded portion of the power distribution network, identifying the candidate power meter as an additional power meter with which the status of the expanded portion of the power distribution network is determined; and
in response to determining that the candidate power meter is not in the expanded portion of the power distribution network, identifying the candidate power meter as an omitted meter that is not used to determine the status of the expanded portion of the power distribution network.

4. The method of claim 3, wherein obtaining a geographic location identifier for the candidate power meter comprises receiving the geographic location identifier from an indexed list of communications channels, power meters, and corresponding geographic location identifiers for the power meters.

5. The method of claim 3, wherein determining whether the candidate power meter is in the expanded portion of the power distribution network comprises determining whether the candidate power meter is within a threshold distance of the referenced power meter.

6. The method of claim 3, wherein determining whether the candidate power meter is in the expanded portion of the power distribution network comprises determining whether the candidate power meter receives power from a same power substation as the referenced power meter.

7. The method of claim 3, wherein determining whether the candidate power meter is in the expanded portion of the power distribution network comprises determining whether the candidate power meter is on a same street as the referenced power meter.

8. The method of claim 3, wherein determining whether the candidate power meter is in the expanded portion of the power distribution network comprises determining whether the candidate power meter is in a same specified geographic area as the referenced power meter.

9. The method of claim 1, wherein providing a status notification comprises providing a power outage notification in response to determining that the amplitude of the signal being received over the target communications channel is less than the outage threshold.

10. The method of claim 1, wherein providing a status notification comprises providing, in response to determining that the amplitude of the signal is not less than the outage threshold, a status notification specifying that a power outage has not been detected.

11. The method of claim 1, further comprising:
obtaining a geographic location identifier corresponding to the referenced power meter;
identifying additional power meters, each additional power meter having a corresponding geographic identifier specifying that the additional power meter is located within a threshold distance of the referenced power meter; and
for each additional power meter:

identifying a corresponding communications channel over which the additional power meter communicates;

obtaining an amplitude of a signal being received over the corresponding communications channel;

determining whether the amplitude of the signal being received over the corresponding communications channel is less than an outage threshold for the corresponding communications channel; and providing, for an expanded portion of the power distribution network that is defined by the geographic location identifier corresponding to the referenced power meter and the additional power meters, a second status notification that specifies a status of the expanded portion of the power distribution network.

12. A system comprising:

a data store storing a plurality of outage thresholds, each outage threshold corresponding to a communications channel, at a center channel frequency relative to other communication channels in a block and with communication channels of the block on either side of the center channel frequency, over which a power meter in a power distribution network communicates; and a status subsystem coupled to the data store, the status subsystem comprising at least one processor configured to obtain an amplitude of a signal being received over a target communications channel, determine a status of a first portion of the power distribution network based on the amplitude of the signal being received over the target communications channel relative to the outage threshold corresponding to the target communications channel, and provide a status notification specifying the status of the first portion based on the determination of the status of the first portion of the power distribution network.

13. The system of claim 12, wherein the status subsystem is further configured to obtain a geographic location identifier corresponding to a first power meter from which the signal is received over the target communications channel, determine that signals corresponding to additional power meters are received over other channels in the block of communications channels, determine, for each of the other channels, whether an amplitude of a signal being received over the other channel is less than an outage threshold for the other channel, and provide a second status notification that specifies a status of an expanded portion of the power distribution network, where the expanded portion of the power distribution network is defined by the first power meter and the additional power meters.

14. The system of claim 13, wherein the status subsystem is further configured to obtain, for each of the other channels, a geographic location identifier for a candidate power meter communicating over the other channel, determine whether the candidate power meter is in the expanded portion of the power distribution network, identify the candidate power meter as an additional power meter in response to determining that the candidate power meter is in the expanded portion of the power distribution network, and identify the candidate power meter as an omitted meter in response to determining that the candidate power meter is not in the expanded portion of the power distribution network, where an additional power meter is a power meter with which the status of the expanded portion of the power distribution network is determined, and where an omitted power meter is a power meter that is not used to determine the status of the expanded portion of the power distribution network.

15. The system of claim 14, wherein the status subsystem is further configured to receive the geographic location identifier from an indexed list of communications channels, power meters, and corresponding geographic location identifiers for the power meters.

16. The system of claim 14, wherein the status subsystem is further configured to determine that the candidate power meter is in the expanded portion of the power distribution network based on the candidate power meter being within a threshold distance of the first power meter.

17. The system of claim 14, wherein the status subsystem is further configured to determine that the candidate power meter is in the expanded portion of the power distribution network based on the candidate power meter receiving power from a same power substation as the first power meter.

18. A non-transient computer storage medium encoded with a computer program, the program comprising instructions that when executed by data processing apparatus cause the data processing apparatus to perform operations comprising:

receiving a status request requesting a status of a first portion of a power distribution network, the request including a reference to a referenced power meter that is located within the first portion of the power distribution network for which the status is requested;

selecting a block of communications channels that includes a target communications channel, at a center channel frequency relative to other communication channels in the block and with communication channels of the block on either side of the center channel frequency, over which a signal corresponding to the referenced power meter is received;

obtaining an amplitude of the signal being received over the target communications channel;

determining whether the amplitude of the signal being received over the target communications channel is less than an outage threshold for the target communications channel; and in response to determining whether the amplitude of the signal being received over the target communications channel is less than the outage threshold for the target communications channel, providing a status notification that specifies the status of the first portion of the power distribution network for which the status has been requested.

* * * * *